(12) United States Patent
Inoue et al.

(10) Patent No.: US 10,619,546 B2
(45) Date of Patent: Apr. 14, 2020

(54) EXHAUST TREATMENT DEVICE FOR DIESEL ENGINE

(71) Applicant: KUBOTA Corporation, Osaka-shi, Osaka (JP)

(72) Inventors: Katsushi Inoue, Sakai (JP); Koichi Funaki, Sakai (JP); Masanori Fujiwara, Sakai (JP); Tamotsu Kuno, Sakai (JP); Kentaro Kita, Sakai (JP); Yuki Yoshita, Sakai (JP)

(73) Assignee: KUBOTA Corporation, Osaka-Shi, Osaka (JP)

( * ) Notice: Subject to any disclaimer, the term of this patent is extended or adjusted under 35 U.S.C. 154(b) by 0 days.

(21) Appl. No.: 16/391,690

(22) Filed: Apr. 23, 2019

(65) Prior Publication Data

US 2019/0323406 A1  Oct. 24, 2019

(30) Foreign Application Priority Data

Apr. 24, 2018  (JP) ................. 2018-082979

(51) Int. Cl.
*F01N 9/00* (2006.01)
*F01N 3/023* (2006.01)
*F01N 11/00* (2006.01)

(52) U.S. Cl.
CPC ............. *F01N 9/002* (2013.01); *F01N 3/023* (2013.01); *F01N 11/002* (2013.01);
(Continued)

(58) Field of Classification Search
CPC .... F01N 9/002; F01N 11/002; F01N 2560/08; F01N 2900/1406; F01N 3/023
(Continued)

(56) References Cited

U.S. PATENT DOCUMENTS 8,384,397 B2 * 2/2013 Bromberg ............... F01N 3/025
324/636
8,919,105 B2 * 12/2014 Takayanagi ........ B01D 46/0086
60/274

(Continued)

FOREIGN PATENT DOCUMENTS

EP  1582720 A1  10/2005
EP  2525056 A1  11/2012
(Continued)

OTHER PUBLICATIONS

European Search Report dated Aug. 27, 2019 in EP Application No. 19166371.5.

*Primary Examiner* — Tom P Duong
(74) *Attorney, Agent, or Firm* — Panitch Schwarze Belisario & Nadel LLP

(57) ABSTRACT

There is provided an exhaust treatment device for a diesel engine that can prevent unnecessary alarm for ash deposition from being issued. In the exhaust treatment device, a timer measures integrated time of a state of non-regenerative operation which ranges from an end of DPF regeneration to a next time point where the differential pressure reaches a regeneration request value. A counter acquires the short interval count if the integrated time is a short interval shorter than a predetermined decision time. An alarm device issues an alarm if the consecutive short interval count reaches a predetermined plural necessary count for alarm. A short interval count having been already acquired is preferably reset to 0 if the integrated time of the state of non-regenerative operation is a long interval, not shorter than a predetermined decision time, before the short interval count reaches the predetermined necessary count for alarm.

20 Claims, 4 Drawing Sheets

(52) U.S. Cl.
CPC .. *F01N 2560/08* (2013.01); *F01N 2900/0421* (2013.01); *F01N 2900/1406* (2013.01)

(58) Field of Classification Search
USPC .......................... 422/168; 60/274, 286, 296
See application file for complete search history.

(56) References Cited

U.S. PATENT DOCUMENTS

| | | | |
|---|---|---|---|
| 9,046,017 B2* | 6/2015 | Nakazato | F02D 41/0245 |
| 9,719,399 B2 | 8/2017 | Odendall | |
| 2006/0016177 A1* | 1/2006 | Tsutsumoto | F01N 3/021 |
| | | | 60/295 |
| 2007/0000241 A1* | 1/2007 | Funke | F01N 3/025 |
| | | | 60/295 |
| 2008/0314029 A1* | 12/2008 | Okugawa | F02D 41/029 |
| | | | 60/286 |
| 2010/0229538 A1* | 9/2010 | Bloms | F01N 3/0256 |
| | | | 60/295 |
| 2012/0204537 A1* | 8/2012 | Dea | F01N 9/002 |
| | | | 60/273 |
| 2013/0227933 A1* | 9/2013 | O'Neil | F01N 3/023 |
| | | | 60/274 |
| 2015/0361860 A1* | 12/2015 | Qi | F01N 11/002 |
| | | | 60/286 |

FOREIGN PATENT DOCUMENTS

| | | |
|---|---|---|
| EP | 2578826 A1 | 4/2013 |
| EP | 3124762 A1 | 2/2017 |
| JP | 2011202573 A | 10/2011 |

* cited by examiner

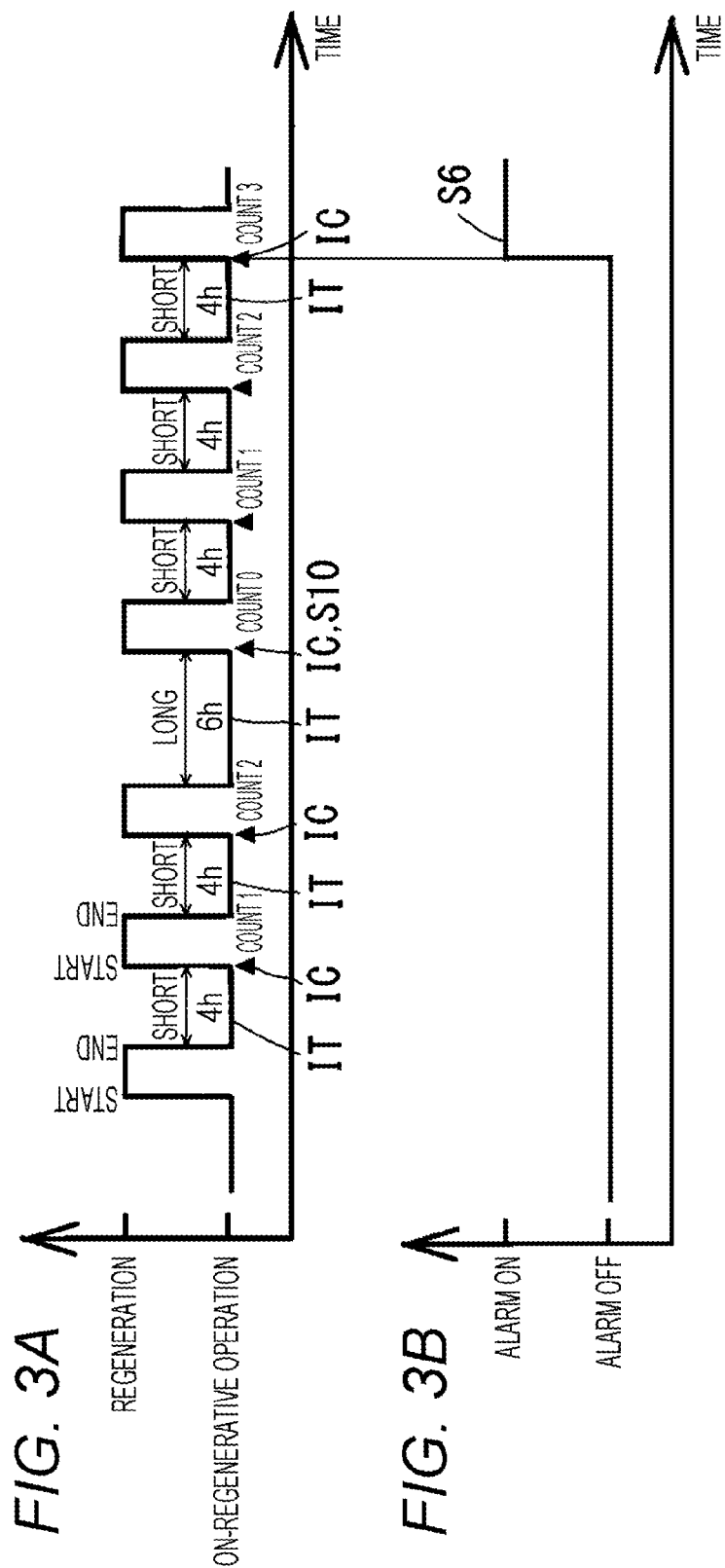

EXHAUST TREATMENT DEVICE FOR DIESEL ENGINE

CROSS-REFERENCE TO RELATED APPLICATION

This application claims priority under 35 U.S.C. § 119(b) to Japanese Application No. 2018-082979, filed Apr. 24, 2018, the disclosure of which is incorporated by reference herein in its entirety.

BACKGROUND OF THE INVENTION

(1) Field of the Invention

The present invention relates to an exhaust treatment device for a diesel engine.

(2) Description of Related Art

In a conventional exhaust treatment device for an engine, an ash deposition alarm is unconditionally issued even if, after the differential pressure between an exhaust inlet and an exhaust outlet of a DPF has reached a predetermined threshold value, a state of ash clogging of the DPF has changed to improve pressure loss in the DPF. Sometimes the ash deposition alarm is unnecessarily issued.

SUMMARY OF THE INVENTION

It is an object of the present invention to provide an exhaust treatment device for a diesel engine capable of preventing the unnecessary ash deposition alarm from being issued.

According to the present invention, a timer measures integrated time (i.e. time period) of a state of non-regenerative operation, which ranges from (i.e. runs from) an end of DPF regeneration to a next time point where the differential pressure reaches a regeneration request value; a counter acquires a short interval count, if the integrated time is a short interval shorter than a predetermined decision time; and an alarm device issues an alarm, if a consecutive short interval count reached a predetermined necessary count for alarm.

According to the present invention, unnecessary ash deposition alarm is prevented from being issued.

BRIEF DESCRIPTION OF THE DRAWINGS

FIGS. 2A, 2B and 2C are schematic drawings illustrating various regulation devices used for the engine illustrated in FIG. 1, in which FIG. 2A illustrates a suspension period regulating device, FIG. 2B illustrates a decision time regulating device, and FIG. 2C illustrates a necessary-count-for-alarm regulating device;

FIGS. 3A and 3B are time charts explaining an operational state of the engine illustrated in FIG. 1, and an alarm start/stop operation, in which FIG. 3A is a time chart illustrating an operational state of the engine, and FIG. 3B is a time chart illustrating the alarm start/stop operation.

DETAILED DESCRIPTION OF PREFERRED EMBODIMENTS

FIGS. 1 to 4 are drawings explaining an engine according to an embodiment of the present invention. In this embodiment, a vertical water-cooled, in-line, four-cylinder diesel engine equipped with an exhaust treatment device will be explained.

The engine will be outlined below.

Figure 1:
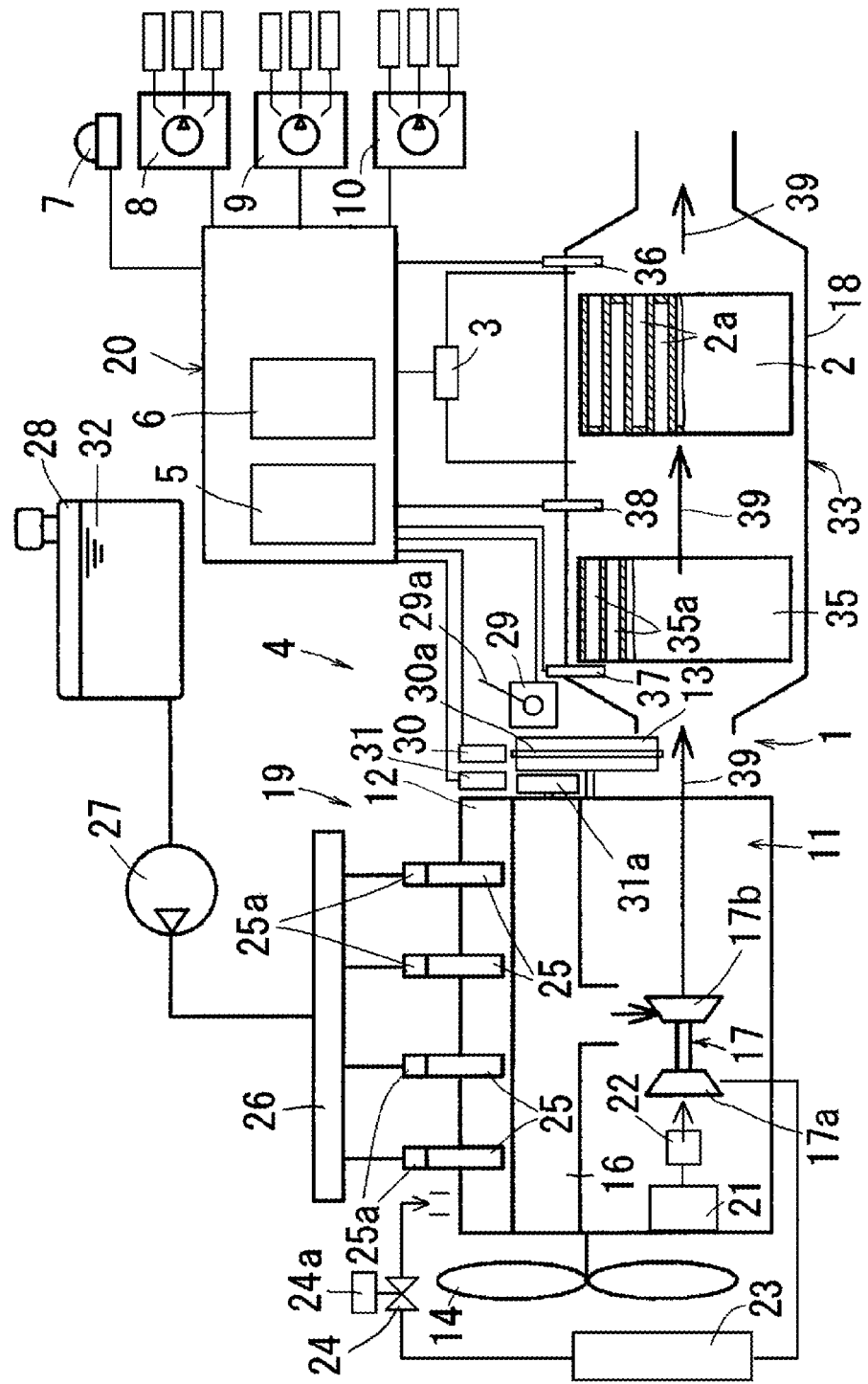
FIG. 1 is a schematic drawing of an engine according to an embodiment of the present invention.

As illustrated in FIG. 1, the engine has a cylinder block (11), a cylinder head (12) assembled on an upper part of the cylinder block (11), a flywheel (13) disposed on the rear side of the cylinder block (11), an engine cooling fan (14) disposed on the front side of the cylinder block (11), an intake manifold (not illustrated) disposed on one lateral side of the cylinder head (12), an exhaust manifold (16) disposed on the other lateral side of the cylinder head (12), a supercharger (17) connected to the exhaust manifold (16), and, an exhaust treatment case (18), a fuel supply device (19), and an electronic control device (20) which are disposed on the exhaust downstream side of the supercharger (17).

An intake device will be outlined below.

As illustrated in FIG. 1, the intake device has a compressor (17a) of the supercharger (17), an air cleaner (21) disposed on the intake upstream side of the compressor (17a), an air flow sensor (22) disposed between the air cleaner (21) and the compressor (17a), an intercooler (23) disposed on the exhaust downstream side of the compressor (17a), an intake throttle valve (24) disposed on the intake downstream side of the intercooler (23), and an intake manifold (not illustrated) disposed on the intake downstream side of the intake throttle valve (24).

The air flow sensor (22), and an electric actuator (24a) of the intake throttle valve (24) are electrically connected to the electronic control device (20).

For the electronic control device (20), used is an engine ECU. ECU is an abbreviation for electronic control unit, which is a microcomputer.

The fuel supply device (19) will be outlined as below.

As illustrated in FIG. 1, the fuel supply device (19) is of common rail type, and has a plurality of fuel injectors (25) inserted to the individual cylinders, a common rail (26) that distributes a fuel stored under pressure to the plurality of fuel injectors (25), a fuel supply pump (27) that pumps the fuel to the common rail (26), and a fuel tank (28).

The fuel supply pump (27), and a solenoid valve (25a) of the fuel injector (25) are electrically connected to the electronic control device (20). To the electronic control device (20), electrically connected are an accelerator sensor (29), a crankshaft sensor (30), and a cylinder discrimination sensor (31). The accelerator sensor (29) detects a target rotational speed of engine, and the crankshaft sensor (30) detects an actual rotational speed of engine and crank angle. The cylinder discrimination sensor (31) detects combustion stroke of the individual cylinders.

In the fuel supply device (19), engine load is calculated by the electronic control device (20), on the basis of deviation between target rotational speed and actual rotational speed of the engine; the solenoid valve (25a) of the fuel injector (25) is opened in a predetermined timely manner for a predetermined length of time, corresponding to the target rotational speed of the engine and the engine load; and fuel injector (25) injects a predetermined volume of fuel (32) to the individual cylinders in a predetermined timely manner. The fuel (32) is now a diesel fuel.

As illustrated in FIG. 1, the accelerator sensor (29) is a device that detects a preset position of the accelerator lever (29a) pointing the target rotational speed. A potentiometer is used for the accelerator sensor (29).

As illustrated in FIG. 1, the crankshaft sensor (30) detects passage of projections of a crank angle detection disk (30a) attached to the flywheel (13). The crank angle detection disk (30a) has, along its circumference, one reference projection and a large number of phase projections arranged at regular intervals. Using transit speed of these projections, the electronic control device (20) calculates the actual rotational speed, and calculates the crank angle on the basis of differential phase between the phase projections having been passed and the reference projection.

The cylinder discrimination sensor (31) detects passage of projections of a cylinder discrimination disk (31a) attached to a camshaft of a valve train (not illustrated). The cylinder discrimination disk (31a) has one projection on its circumference. Referring to passage of this projection, the electronic control device (20) discriminates 4-cycle combustion strokes.

An electromagnetic pickup sensor is used for the crankshaft sensor (30) and the cylinder discrimination sensor (31).

The exhaust device will be outlined below.

As illustrated in FIG. 1, the exhaust device has the exhaust manifold (16), an exhaust turbine (17b) of the supercharger (17) disposed on the exhaust downstream side of the exhaust manifold (16), and an exhaust treatment device (33) provided on the exhaust downstream side of the exhaust turbine (17b). A series of paths from the exhaust manifold (16) up to the exhaust treatment device (33) makes up an exhaust path (1).

The exhaust treatment device (33) will be outlined below.

The exhaust treatment device (33) has the exhaust treatment case (18) disposed on the exhaust downstream side of the exhaust turbine (17b) of the supercharger (17), a DOC (35) disposed on the exhaust upstream side inside the exhaust treatment case (18), a DPF (2) disposed on the exhaust downstream side in the exhaust treatment case (18), a differential pressure sensor (3) that detects differential pressure between the exhaust inlet side and the exhaust outlet side of the DPF (2), a DPF outlet temperature sensor (36) that detects exhaust temperature on the exhaust outlet side of the DPF (2), a DOC inlet temperature sensor (37) that detects exhaust temperature on the exhaust inlet side of the DOC (35), and a DPF inlet temperature sensor (38) that detects exhaust temperature on the exhaust inlet side of the DPF (2).

All of these sensors are electrically connected to the electronic control device (20).

The aforementioned individual sensors, the electronic control device (20), the DOC (35), the intake throttle valve (24), and the fuel supply device (19) compose a regeneration device (4) of the DPF.

In the regeneration device (4) of the DPF, a state of clogging of DPF (2) is estimated by the electronic control device (20), on the basis of the differential pressure between the exhaust outlet side and the exhaust inlet side of the DPF (2), and the DPF (2) is regenerated upon arrival of the differential pressure at the regeneration request value.

That is, the engine has, as illustrated in FIG. 1, the DPF (2) disposed on the exhaust path (1), the differential pressure sensor (3) that detects differential pressure between the exhaust inlet and the exhaust outlet of the DPF (2), and the regeneration device (4), and is designed so as to make the regeneration device (4) carry out DPF regenerating treatment that combusts PM deposited in the DPF (2), upon arrival of the differential pressure detected by the differential pressure sensor (3) at the predetermined regeneration request value.

The DPF, abbreviation from diesel particular filter, captures PM in engine exhaust. PM is an abbreviation for particulate matter. As illustrated in FIG. 1, the DPF (2) uses a wall-flow type ceramic honeycomb structure having inside a large number of cells (2a) that are juxtaposed along the axial length direction, with the inlet and the outlet of neighboring cells (2a) (2a) alternately plugged.

The DOC, abbreviated from diesel oxide catalyst, oxidizes CO (carbon monoxide) and NO (nitrogen monoxide) contained in the engine exhaust. The DOC (35) uses a flow-through type ceramic honeycomb structure having inside a large number of cells (35a) that are juxtaposed along the axial length direction in a penetrating manner, with an oxidizing catalyst component such as platinum, palladium or rhodium supported in the cells.

As illustrated in FIG. 1, in the exhaust treatment device (33), PM contained in an exhaust (39) of engine is trapped by the DPF (2), the PM deposited in the DPF (2) is continuously oxidized or combusted at relatively low temperatures using $NO_2$ (nitrogen dioxide) obtained by oxidizing NO (nitrogen monoxide) in the exhaust (39) using the DOC (35). Then upon arrival of the differential pressure detected by the differential pressure sensor (3) at the predetermined regeneration request value, the common rail type fuel supply device (19) performs post injection, while being controlled by the electronic control device (20), so as to subject an unburnt fuel fed to the exhaust (39) to catalytic combustion in the DOC (35), to thereby combust the PM deposited in the DPF (2) at relatively high temperature. The DPF (2) is thus regenerated.

If the exhaust temperature is low, and the inlet exhaust temperature of the DOC (35) has not yet reached activation temperature of the DOC (35), the intake throttle valve (24) is tightened under the control by the electronic control device (20), so as to elevate the exhaust temperature.

Start point of the DPF regenerating treatment is defined as described below.

If the inlet exhaust temperature of the DOC (35) has reached the activation temperature of the DOC (35) at a time point the differential pressure detected by the differential pressure sensor (3) reached the regeneration request value, and the post injection starts at this time point, such start point of post injection is defined to be the start point of the DPF regenerating treatment.

If inlet exhaust temperature of the DOC (35) has not reached the activation temperature of the DOC (35) at a time point where the differential pressure detected by the differential pressure sensor (3) reached the regeneration request value, and the intake throttle valve (24) is tightened, a start point where the intake throttle valve (24) is tightened is defined to be the start point of the DPF regenerating treatment. In this case, a time point where the post injection is started, upon arrival of the inlet exhaust temperature of the DOC (35) at the activation temperature of the DOC (35), may be defined to be the start point of the DPF regenerating treatment.

Note that, in place of the post injection using the common-rail type fuel supply device (19), employable is exhaust pipe injection by which unburnt fuel is injected into the exhaust (39), through an exhaust pipe fuel injector (not illustrated) disposed between the exhaust turbine (17b) of the supercharger (17) and the DOC (35).

The engine is equipped with an ash deposition alarm device that alarms ash deposition in the DPF.

The ash means an ash composed of zinc compound, calcium compound and so forth.

The zinc compound is derived from anti-wear agent or antioxidant contained in engine oil, meanwhile the calcium compound is derived from cleaning agent or acid neutralizer contained in the engine oil.

As illustrated in FIG. 1, the ash deposition alarm device has a timer (5), a counter (6), and an alarm device (7). As illustrated in FIG. 3A, the timer (5) measures the integrated time (IT) of a state of non-regenerative operation, which ranges from the end of DPF regeneration to the next time point where the differential pressure reaches a regeneration request value; and the counter (6) acquires the short interval count (IC), if the integrated time (IT) is the short interval shorter than a predetermined decision time.

The integrated time (IT) of a state of non-regenerative operation does not include integrated time of a non-operating state of engine.

Figure 4:
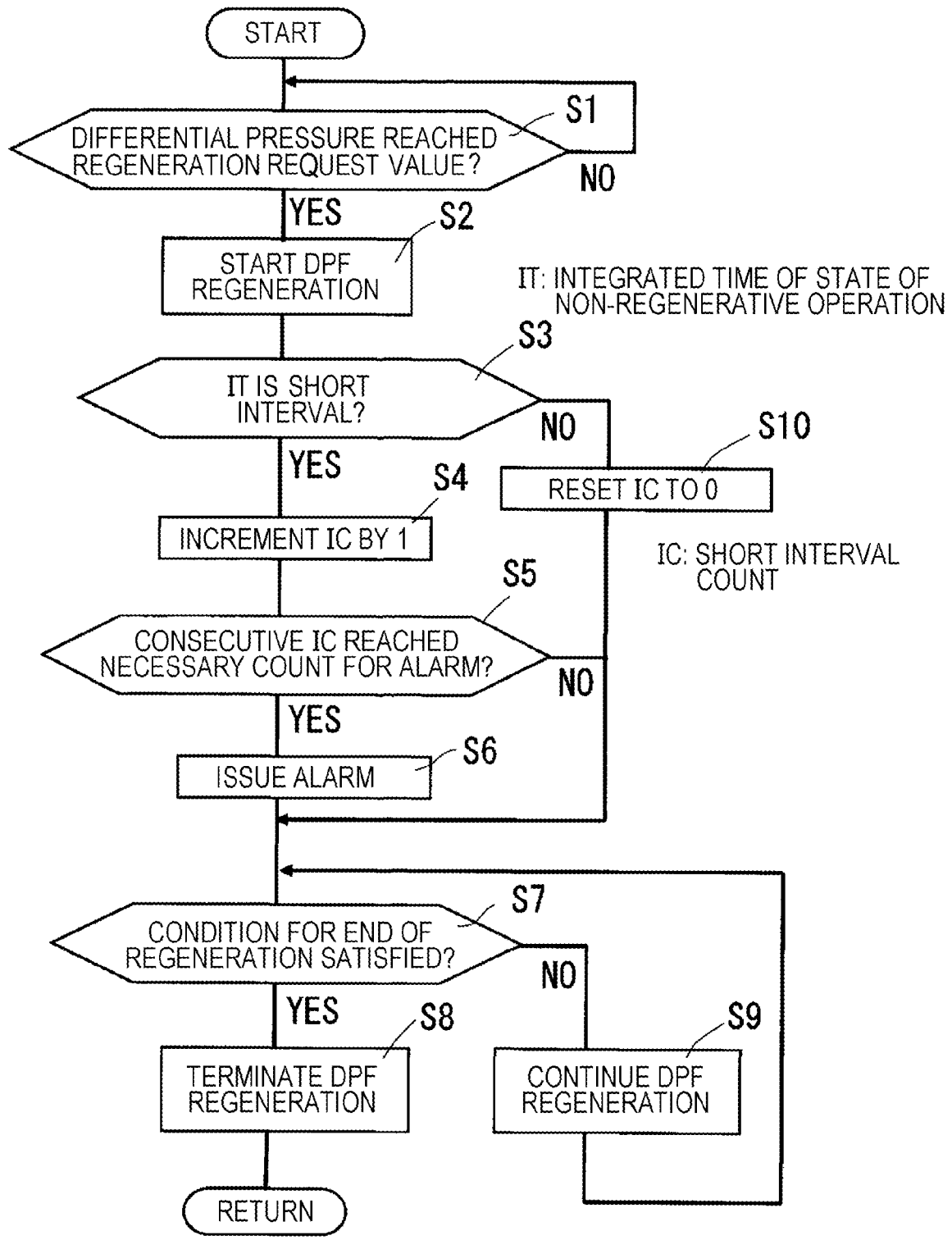
FIG. 4 is a flowchart illustrating a DPF regeneration process and an alarming process for the engine illustrated in FIG. 1.

As illustrated in FIGS. 3A, 3B and 4, the alarm device (7) issues an alarm (S6), if the consecutive short interval count (IC) reached a predetermined necessary count for alarm.

As illustrated in FIG. 3A, if a state of ash clogging has changed after a short interval, and a subsequent interval has exceeded the length of time of the short interval, it is then estimated that the state of ash clogging in the DPF (2) has changed to improve pressure loss in the DPF (2). Since this embodiment conditionally uses, for alarming, the count of consecutive short intervals without any interposed interval with supposedly improved pressure loss, estimation of ash deposition will be more reliable, and unnecessary alarm will be prevented from being issued.

As illustrated in FIGS. 3A, 3B and 4, a short interval count (IC) having been already acquired is reset to 0 (S10), if the integrated time (IT) of the state of non-regenerative operation is a long interval not shorter than a predetermined decision time, before the consecutive short interval count (IC) reaches a predetermined necessary count for alarm.

As illustrated in FIG. 3A, if a long interval is observed after the short interval, it is then estimated that the state of ash clogging in the DPF (2) has changed to improve pressure loss in the DPF. According to the ash deposition alarm device, since the already acquired short interval count (IC) is reset to 0 (S10) in this case, estimation of ash deposition will be more reliable, and unnecessary alarm will be prevented from being issued.

As illustrated in FIG. 1, the timer (5) and the counter (6) are built in the electronic control device (20).

The alarm device (7) is composed of an alarm lamp electrically connected to the electronic control device (20), and an alarm is issued by illumination of the alarm lamp. A light emitting diode is used for the alarm lamp.

In place of the alarm lamp, a display such as liquid crystal display or organic EL display is employable for the alarm device (7), so as to issue the alarm in the form of letters, figures or symbols. EL is an abbreviation for electro-luminescence.

In place of the alarm lamp, an alarm sound generating device such as alarm buzzer or alarm bell is employable for the alarm device (7), so as to issue the alarm in the form of alarm sound.

The ash deposition alarm device is designed such that the alarm device (7) does not issue an alarm, over a duration of a first run of the engine after being shipped up to a lapse of predetermined suspension period for alarm, even if the consecutive short interval count (IC) has reached the predetermined necessary count for alarm.

Since the ash would be unlikely to deposit to a level that needs cleaning, over a predetermined duration of run of the engine after being shipped, a highly possible cause for occurrence of short interval would be, for example, abnormal deposition of PM due to failure of the fuel injector, rather than reasons attributable to the ash deposition per se. According to this ash deposition alarm device, unnecessary alarm of ash deposition will be suppressed from being issued, since the suspension period for alarm is provided.

Figure 2A:
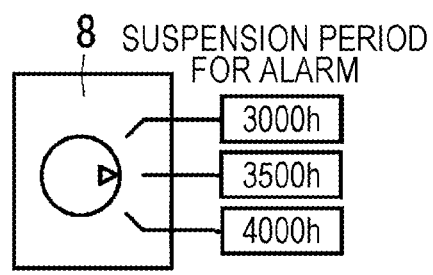

As illustrated in FIGS. 1 and 2A, the ash deposition alarm device has a suspension period regulating device (8) that regulates the suspension period for alarm.

A short suspension period for alarm will result in early cancellation of the suspension for alarm, advantageously suppressing erroneous alarming, meanwhile a long suspension period for alarm will advantageously suppress excessive alarming. For this ash deposition alarm device, the suspension period for alarm may be adjusted suitably for applications of the engine, taking these advantages into consideration.

Figure 2B:
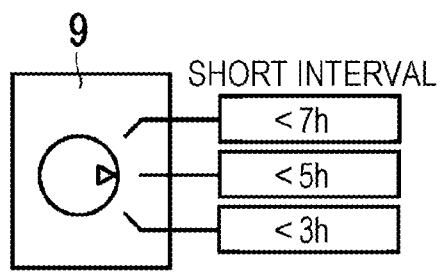

As illustrated in FIGS. 1 and 2B, the ash deposition alarm device has a decision time regulating device (9) that regulates the decision time.

A long decision time will result in alarming at a time point where the ash deposition is relatively light, advantageously suppressing erroneous alarming, meanwhile a short decision time will result in alarming at a time point where the ash deposition is relatively heavy, advantageously suppressing excessive alarming. For this ash deposition alarm device, the decision time may be adjusted suitably for applications of the engine, taking these advantages into consideration.

Figure 2C:
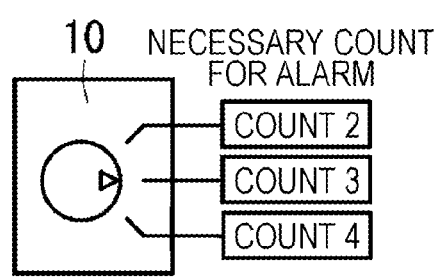

As illustrated in FIGS. 1 and 2C, the ash deposition alarm device has a necessary-count-for-alarm regulating device 10 that regulates the necessary count for alarm.

A small necessary count for alarm will result in alarming at a time point where the consecutive short interval count is small, advantageously suppressing erroneous alarming, meanwhile a large necessary count for alarm will result in alarming at a time point where the count of consecutive short intervals is large, advantageously suppressing excessing alarming. For this ash deposition alarm device, the necessary count for alarm may be adjusted suitably for applications of the engine, taking these advantages into consideration.

As illustrated in FIGS. 2A to 2C, all of the suspension period regulating device (8), the decision time regulating device (9), and the necessary-count-for-alarm regulating device (10) are dial-selectable.

The suspension period regulating device (8), illustrated in FIG. 2A, allows a choice from three levels of suspension period for alarm, namely 3000 hours, 3500 hours, and 4000 hours.

The decision time regulating device (9), illustrated in FIG. 2B, allows a choice from three levels of decision time of short interval, namely <7 hours, <5 hours, and <3 hours.

The necessary-count-for-alarm regulating device (10), illustrated in FIG. 2C, allows a choice from three levels of necessary count for alarm, namely count 2, count 3, and count 4.

Operation of the ash deposition alarm device will be explained referring to the time chart.

In this time chart, the suspension period is preset to 3500 hours, the decision time of short interval is preset to shorter than 5 hours, and the necessary count for alarm is preset to count 3.

Referring now to FIG. 3A, if the first regeneration after shipment of the engine completed, the second regeneration started, and the integrated time (IT) of the state of non-regenerative operation from the end of the first regeneration up to the start of the second regeneration is 4 hours, the integrated time (IT) is determined to represent a short interval, and the short interval count (IC) will be count 1.

If also the next integrated time (IT) is 4 hours and determined to represent a short interval, the short interval count (IC) will be count 2.

If the next integrated time (IT) is 6 hours and determined to represent a long interval, the already acquired short interval count (IC) will be reset to 0 (S10).

Next, if the integrated time (IT) is determined to represent a short interval three times in a row, the short interval count (IC) will be determined to reach count 3, that is the necessary count for alarm, and an alarm will be issued (S6).

Note however that the alarm will not be issued, if 3500 hours has not passed after the engine was shipped.

Issuance of alarm is interpreted as that the ash deposition in the DPF exceeds an allowable limit, so that the DPF needs to be cleaned typically by backwash using air blow.

Procedures for DPF regeneration and alarming by the electronic control device will be explained referring to a flowchart.

As illustrated in FIG. 4, whether the differential pressure between the exhaust outlet and inlet of the DPF (2) has reached the regeneration request value, or not, is determined in step (S1). The determination is repeated until the result turns into YES, and upon determination of YES, the process goes to step (S2).

In step (S2), DPF regenerating treatment starts, and the process goes to step (S3). In the DPF regenerating treatment, the intake throttle valve (24) will be tightened if the inlet exhaust temperature of the DOC (35) has not reached the activation temperature of the DOC (35), and after arrival at the activation temperature, an unburnt fuel is fed to the exhaust (39) by post injection by the fuel supply device (19), the unburnt fuel is subjected to catalytic combustion in the DOC (35), the exhaust temperature elevates, and thereby the PM deposited in the DPF (2) is removed by combustion.

In step (S3), whether the integrated time (IT) of the state of non-regenerative operation which ranges from the end of last regeneration before the present regeneration, up to the start of the present regeneration is a short interval, or not, is determined. If the determination is YES, the process goes to step (S4).

In step (S4), the short interval count (IC) is incremented by 1, and the process goes to step (S5).

In step (S5), whether the consecutive interval count (IC) has reached the necessary count for alarm, or not, is determined. If the determination is YES, the process goes to step (S6).

In step (S6), an alarm is issued, and the process goes to step (S7).

If the determination in step (S5) is NO, the process goes to step (S7).

In step (S7), whether a condition for the end of regeneration is satisfied or not is determined. If the determination is YES, the process goes to step (S8).

In step (S8), the DPF regenerating treatment is terminated, and the process returns back to step (S1).

If the determination in step (S7) is NO, the process goes to step (S9).

In step (S9), the DPF regenerating treatment is continued, and the process goes back to step (S7).

The condition for the end of regeneration means that the integrated time, over which the DPF inlet exhaust temperature is kept at a predetermined regeneration request temperature (at around 500° C., for example) as a result of post injection, reaches a predetermined set time for ending.

Note that, if the DPF outlet exhaust temperature becomes abnormally high (at around 700° C., for example) during the DPF regeneration, the post injection is interrupted in order to avoid heat damage of the DPF (2).

If the determination in step (S3) is NO, the short interval count (IC) is reset to 0 in step (S10), and the process goes to step (S7).

The case where the determination in step (S3) is NO means that the integrated time (IT) of the state of non-regenerative operation is determined to represent a long interval.

The exhaust treatment device may alternatively be designed as follows.

As illustrated in FIGS. 1 and 2C, the exhaust treatment device includes a necessary-count-for-alarm regulating device (10) that regulates the necessary count for alarm, and is designed so that, if one of the decision time regulating device (9) and the necessary-count-for-alarm regulating device (10) is regulated, the other is regulated in a coordinated manner. Since regulation of the one results in regulation of the other in this case, the regulation will be simple and rapid.

A possible example of the coordinated regulation system may be as follows.

Incremental regulation of decision time by the decision time regulating device (9) may be coordinated with decremental regulation of the necessary count for alarm by the necessary-count-for-alarm regulating device (10).

That is, if the incremental regulation of the decision time is carried out by the decision time regulating device (9), the decremental regulation of the necessary count for alarm is designed to be carried out by the necessary-count-for-alarm regulating device (10) in a coordinated manner.

Alternatively, if the decremental regulation of the necessary count for alarm is carried out by the necessary-count-for-alarm regulating device (10), the incremental regulation of the decision time is designed to be carried out by the decision time regulating device (9).

A long decision time will result in alarming at a time point where the ash deposition is relatively light, advantageously suppressing erroneous alarming, meanwhile a small necessary count for alarm will result in alarming at a time point where the count of consecutive short intervals is relatively small, advantageously suppressing erroneous alarming. This coordinated regulation system doubles, and thus enhances, a function for suppressing erroneous alarming.

Another possible example of the coordinated regulation system may be as follows.

Decremental regulation of the decision time by the decision time regulating device (9) may be coordinated with incremental regulation of the necessary count for alarm by the necessary-count-for-alarm regulating device (10).

That is, if the decremental regulation of the decision time is carried out by the decision time regulating device (9), the incremental regulation of the necessary count for alarm is designed to be carried out by the necessary-count-for-alarm regulating device (10) in a coordinated manner.

Alternatively, if the incremental regulation of the necessary count for alarm is carried out by the necessary-count-for-alarm regulating device (10), the decremental regulation of the decision time is designed to be carried out by the decision time regulating device (9) in a coordinated manner.

A short decision time will result in alarming at a time point where the ash deposition is relatively heavy, advantageously suppressing excessive alarming, meanwhile a large necessary count for alarm will result in alarming at a time point where the count of consecutive short intervals is relatively large, advantageously suppressing excessive alarming. This coordinated regulation system doubles, and thus enhances, a function for suppressing excessive alarming.

Another possible coordinated regulation system may be as follows.

Incremental regulation of the decision time by the decision time regulating device (9) may be coordinated with incremental regulation of the necessary count for alarm by the necessary-count-for-alarm regulating device (10).

That is, if the incremental regulation of the decision time is carried out by the decision time regulating device (9), the incremental regulation of the necessary count for alarm is designed to be carried out by the necessary-count-for-alarm regulating device (10) in a coordinated manner.

Alternatively, if the incremental regulation of the necessary count for alarm is carried out by the necessary-count-for-alarm regulating device (10), the incremental regulation of the decision time is designed to be carried out by the decision time regulating device (9) in a coordinated manner.

Another possible coordinated regulation system may be as follows.

Decremental regulation of the decision time by the decision time regulating device (9) may be coordinated with decremental regulation of the necessary count for alarm by the necessary-count-for-alarm regulating device (10).

That is, if the decremental regulation of the decision time is carried out by the decision time regulating device (9), the decremental regulation of the necessary count for alarm is designed to be carried out by the necessary-count-for-alarm regulating device (10) in a coordinated manner.

Alternatively, if the decremental regulation of the necessary count for alarm is carried out by the necessary-count-for-alarm regulating device (10), the decremental regulation of the decision time is designed to be carried out by the decision time regulating device (9) in a coordinated manner.

What is claimed is:

1. An exhaust treatment device for a diesel engine, the device comprising:
    a DPF disposed on an exhaust path;
    a differential pressure sensor that detects differential pressure between an exhaust inlet and an exhaust outlet of the DPF; and
    a regeneration device,
    wherein the regeneration device performs DPF regenerating treatment that combusts PM deposited in the DPF, in response to that the differential pressure detected by the differential pressure sensor has reached a predetermined regeneration request value,
    the exhaust treatment device further comprising:
    a timer;
    a counter; and
    an alarm device,
    wherein
    the timer measures integrated time of a state of non-regenerative operation which ranges from an end of DPF regeneration to a next time point where the differential pressure reaches a regeneration request value,
    the counter acquires a short interval count, if the integrated time is a short interval shorter than a predetermined decision time, and
    the alarm device issues an alarm, if a consecutive short interval count reached a predetermined necessary count for alarm.

2. The exhaust treatment device for a diesel engine according to claim 1, wherein a short interval count having been already acquired is reset to 0, if the integrated time of the state of non-regenerative operation is a long interval not shorter than a predetermined decision time, before the consecutive short interval count reaches the predetermined necessary count for alarm.

3. The exhaust treatment device for a diesel engine according to claim 2, wherein the alarm device does not issue an alarm, over a duration of a first run of the engine after being shipped up to a lapse of predetermined suspension period for alarm, even if the consecutive short interval count has reached the predetermined necessary count for alarm.

4. The exhaust treatment device for a diesel engine according to claim 3, further comprising a suspension period regulating device that regulates the suspension period for alarm.

5. The exhaust treatment device for a diesel engine according to claim 4, further comprising a decision time regulating device that regulates the decision time.

6. The exhaust treatment device for a diesel engine according to claim 2, further comprising a decision time regulating device that regulates the decision time.

7. The exhaust treatment device for a diesel engine according to claim 6, further comprising a necessary-count-for-alarm regulating device that regulates the necessary count for alarm,
    wherein when one of the decision time regulating device and the necessary-count-for-alarm regulating device is regulated, another is regulated in a coordinated manner.

8. The exhaust treatment device for a diesel engine according to claim 7, wherein incremental regulation of the decision time by the decision time regulating device is coordinated with decremental regulation of the necessary count for alarm by the necessary-count-for-alarm regulating device.

9. The exhaust treatment device for a diesel engine according to claim 7, wherein decremental regulation of the decision time by the decision time regulating device is coordinated with incremental regulation of the necessary count for alarm by the necessary-count-for-alarm regulating device.

10. The exhaust treatment device for a diesel engine according to claim 3, further comprising a decision time regulating device that regulates the decision time.

11. The exhaust treatment device for a diesel engine according to claim 2, further comprising a necessary-count-for-alarm regulating device that regulates the necessary count for alarm.

12. The exhaust treatment device for a diesel engine according to claim 1, wherein the alarm device does not issue an alarm, over a duration of a first run of the engine after being shipped up to a lapse of predetermined suspension period for alarm, even if the consecutive short interval count has reached the predetermined necessary count for alarm.

13. The exhaust treatment device for a diesel engine according to claim 12, further comprising a suspension period regulating device that regulates the suspension period for alarm.

14. The exhaust treatment device for a diesel engine according to claim 13, further comprising a decision time regulating device that regulates the decision time.

15. The exhaust treatment device for a diesel engine according to claim 12, further comprising a decision time regulating device that regulates the decision time.

16. The exhaust treatment device for a diesel engine according to claim 1, further comprising a decision time regulating device that regulates the decision time.

17. The exhaust treatment device for a diesel engine according to claim 16, further comprising a necessary-count-for-alarm regulating device that regulates the necessary count for alarm,
   wherein when one of the decision time regulating device and the necessary-count-for-alarm regulating device is regulated, another is regulated in a coordinated manner.

18. The exhaust treatment device for a diesel engine according to claim 17, wherein incremental regulation of the decision time by the decision time regulating device is coordinated with decremental regulation of the necessary count for alarm by the necessary-count-for-alarm regulating device.

19. The exhaust treatment device for a diesel engine according to claim 17, wherein decremental regulation of the decision time by the decision time regulating device is coordinated with incremental regulation of the necessary count for alarm by the necessary-count-for-alarm regulating device.

20. The exhaust treatment device for a diesel engine according to claim 1, further comprising a necessary-count-for-alarm regulating device that regulates the necessary count for alarm.

* * * * *